May 7, 1968  R. P. DUPUIS  3,381,963
NAVAL WARFARE GAME
Filed July 12, 1965
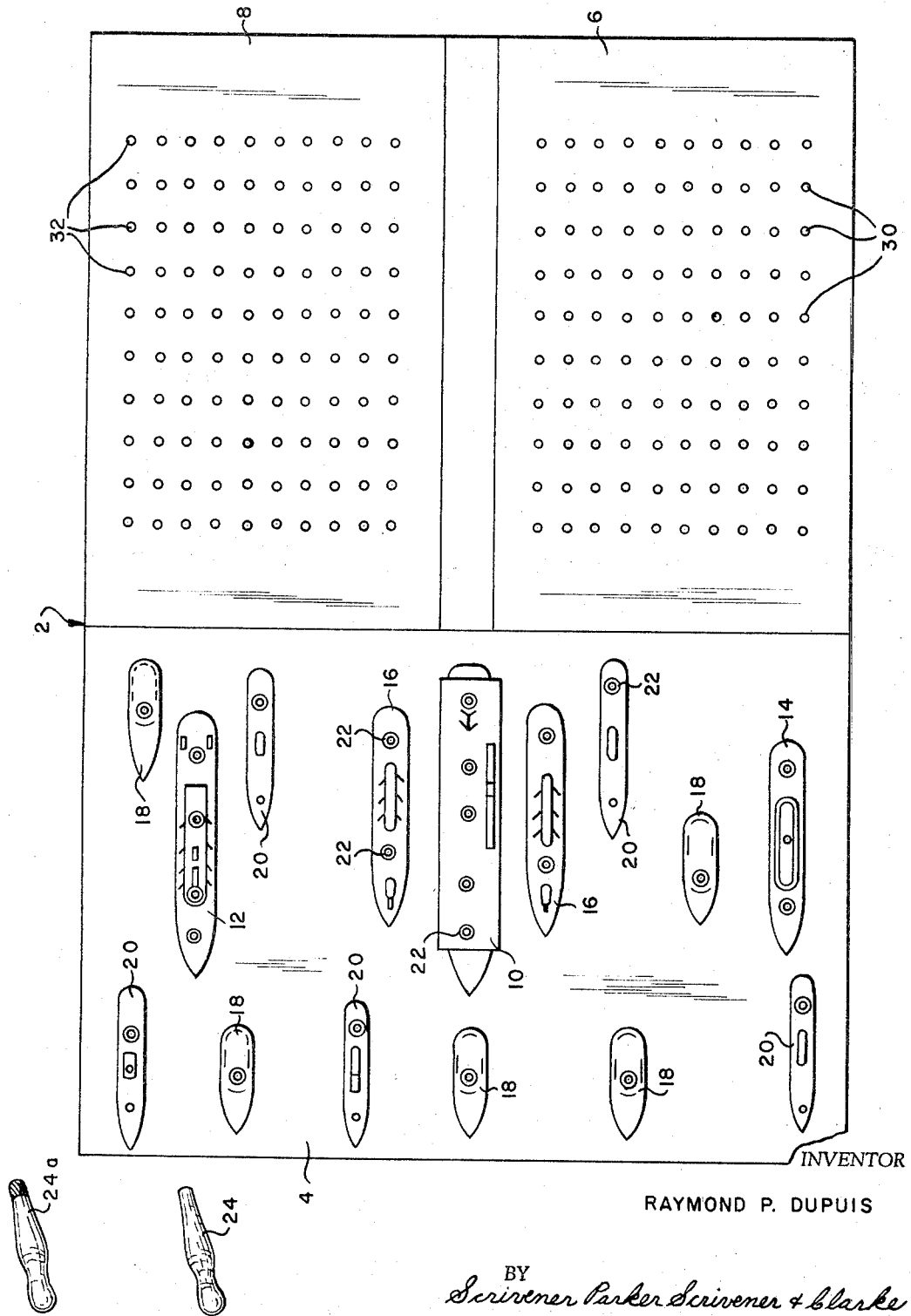
INVENTOR
RAYMOND P. DUPUIS
BY
Scrivener Parker Scrivener & Clarke
ATTORNEYS United States Patent Office 3,381,963
Patented May 7, 1968

3,381,963
NAVAL WARFARE GAME
Raymond P. Dupuis, Fairfield, Calif., assignor to Novelty Associates, Fairfield, Calif., a partnership of California
Filed July 12, 1965, Ser. No. 471,251
7 Claims. (Cl. 273—135)

This invention relates broadly to games and, more particularly, provides a naval warfare game of novel construction, having new and unusual playing members, and being capable of being played in a new and unusual way to provide amusement and edification to the players, who may be any number.

The invention is described in the following specificaton and is illustrated in the single figure of the accompanying drawing which discloses the game board and pegs provided by the invention for each player.

By the present invention I have provided a naval warfare game and the parts and pieces necessary to play it. Any number of persons, probably preferably children, can play, although two players are preferred to a greater number. Each player is provided with a number of representations of ships and a supply of pegs and the objects of each player is to "sink" as many as possible of the ships of his opponent by chance drawing of pegs.

The parts provided to each player are shown in the drawings and comprise a rigid board 2 which is divided generally into a ship area 4 and two peg areas 6, 8. The ship area, which comprises approximately one-half the total area of the board, contains a plurality of representations of ships such as the representations of an aircraft carrier 10, a battleship 12, a cruiser 14, two destroyers 16, five PT boats 18, and five submarines 20, there being fifteen ships in all, although a greater or lesser number may be represented. Each ship figure is provided with one or more peg holes 22, the number of peg holes for each ship figure being proportional to the size and offensive power of the ship. Thus, the aircraft carrier 10 has five peg holes, the battleship 12 has four, the cruiser 14 has three, each destroyer 16 has two, and each PT boat 18 and each submarine 20 has one each. In addition, the peg holes 22 of each ship are colored distinctively to designate the type of ship, as by a ring of color surrounding each peg hole. Thus, the peg holes of the aircraft carrier are colored red, the battleship peg holes are colored white, the cruiser peg holes are colored blue, the destroyer peg holes are colored black, the PT boat peg holes are colored silver, and the submarine peg holes are colored green.

Also laid out on each playing board are the two peg areas 6, 8, and one hundred pegs 24 are provided to go with these. Each peg area covers approximately one-half of the one-half area of the board not covered by the ship area 4, and in each peg area there is a field of ten rows of ten peg holes each, making one hundred peg holes in each peg area. Peg field 6 is most closely adjacent the player and its one hundred peg holes 30 are, at the start of the game, filled with one hundred pegs 24, one peg being in each peg hole. Twenty-six of these one hundred pegs are colored, as shown by pegs 24a, but only at their lower ends so that the colors of the pegs cannot be seen when the pegs are in their respective peg holes. These colored pegs correspond in number and color to the corresponding peg holes in the ship figures of area 4 of the board, and therefore five pegs are colored red to correspond to the five red peg holes of the aircraft carrier 10, four pegs are colored white to correspond to the four white peg holes of the battleship 12, three pegs are colored blue to correspond to the three blue peg holes of the cruiser 14, four pegs are colored black to correspond to the four black peg holes of the two destroyers 16, five pegs are colored silver to correspond to the five silver peg holes of the PT boats 18, and five pegs are colored green to correspond to the five green peg holes of the submarines 20.

At the start of the game the one hundred pegs 24, including the twenty-six colored pegs, are positioned in the peg holes 30 of the peg area 6, the colored pegs being randomly positioned and their positions not being known to either player. The one hundred peg holes 32 of peg area 8 and the peg holes of the ship figures are all empty. The players now play alternately, or in succession if there are more than two players, by picking one of the pegs from the playing area 6. If the peg is not colored it is placed in one of the holes in the peg area 8. If it is colored it is placed in a correspondingly colored hole in the ship area 4, which belongs to the other player. The players continue alternately or in succession to pull pegs from their own peg areas and this is continued until one player has filled all of the holes in one of his opponent's ships, which constitutes the ship to be sunk. On sinking any of his opponent's ships a player is awarded extra plays which may be as follows: for sinking an aircraft carrier five extra pegs in succession; for sinking a battleship four extra pegs in succession; for sinking a cruiser three extra pegs in succession; for sinking a destroyer two extra pegs in succession; and for sinking a PT boat or submarine one extra peg.

When any player has filled all the peg holes in all of the ships of his opponent's ship area, the game is ended and the pegs in the ships' peg holes and any remaining pegs in peg area 6 are placed in the peg area 8 and the players exchange their boards so that neither knows the location of the colored pegs of the new board from which he now must play.

While I have described and illustrated one embodiment of my invention, it will be apparent to those skilled in the art to which it relates that other embodiments, as well as modifications of that disclosed, may be made and practised without departing in any way from the spirit or scope of the invention for the limits of which reference must be made to the appended claims.

What is claimed is:

1. A naval warfare game to be played by at least two players each having the objective of sinking all of his opponent's ships, the playing pieces of each player comprising a playing board having a ship area having thereon representations of a plurality of ships of different types each having at least one peg hole which is colored, representations of ships of different types having peg holes of different colors, the board also having a peg area having a plurality of peg holes therein, and a peg for each hole of the peg area all of which are randomly positioned in the peg holes of the peg area at the start of the game, some of said pegs being colored at a part which is not visible when the peg is in a peg hole with a color corresponding to one of the colors of said colored peg holes, the number of pegs of each color being equal to the number of peg holes of the same color whereby as the players alternately draw pegs from the peg areas of their boards colored pegs drawn by them are placed in the correspondingly colored peg holes of the ship area of the opponent's board until all of the peg holes of any ship of the opponent's board are filled, which constitutes sinking of the ship, the game continuing until either player sinks all of his opponent's ships.

2. A naval warfare game to be played by at least two players each having the objective of sinking all of his opponent's ships, the playing pieces of each player comprising a playing board having a ship area having thereon representations of a plurality of ships of different types each having one or more peg holes, the number of peg holes being proportional to the relative offensive power of the type of ship represented and the peg holes of each ship being colored, representations of ships of different types having peg holes of different colors, the board also having a peg area having a plurality of peg holes therein, and a peg for each hole of the peg area all of which are randomly positioned in the peg holes of the peg area at the start of the game, some of said pegs being colored at a part which is not visible when the peg is in a peg hole with a color corresponding to one of the colors of said colored peg holes, the number of pegs of each color being equal to the number of peg holes of the same color whereby as the players alternately draw pegs from the peg areas of their boards colored pegs drawn by them are placed in the correspondingly colored peg holes of the ship area of the opponent's board until all of the peg holes of any ship of the opponent's board are filled, which constitutes sinking of the ship, the game continuing until either player sinks all of his opponent's ships.

3. A naval warfare game to be played by at least two players each having the objective of sinking all of his opponent's ships, the playing pieces of each player comprising a playing board having a ship area having thereon representations of a plurality of ships of different types each having at least one peg hole which is colored, representations of ships of different types having peg holes of different colors, the board also having a peg area having a plurality of peg holes therein, and a peg for each hole of the peg area all of which are randomly positioned in the peg holes of the peg area at the start of the game, some of said pegs being colored at a part which is not visible when the peg is in a peg hole with a color corresponding to one of the colors of said colored peg holes, the remaining pegs being uncolored, the number of pegs of each color being equal to the number of peg holes of the same color whereby as the players alternately draw pegs from the peg areas of their boards colored pegs drawn by them are placed in the correspondingly colored peg holes of the ships area of the opponent's board until all of the peg holes of any ship of the opponent's board are filled, which constitutes sinking of the ship, the game continuing until either player sinks all of his opponent's ships.

4. A naval warfare game is to be played by at least two players each having the objective of sinking all of his opponent's ships, the playing pieces of each player comprising a playing board having a ship area having thereon representations of a plurality of ships of different types each having at least one peg hole which is colored, representations of ships of different types having peg holes of different colors, the board also having a peg area having a plurality of peg holes therein, and a peg for each hole of the peg area all of which are randomly positioned in the peg holes of the peg area at the start of the game, some of said pegs being colored at a part which is not visible when the peg is in a peg hole with a color corresponding to one of the colors of said colored peg holes, the remaining pegs being uncolored, the number of pegs of each color being equal to the number of peg holes of the same color whereby as the players alternately draw pegs from the peg areas of their boards colored pegs drawn by them are placed in the correspondingly colored peg holes of the ship area of the opponent's board until all of the peg holes of any ship of the opponent's board are filled, which constitutes sinking of the ship, the game continuing until either player sinks all of his opponent's ships, and the board having a second peg area having a plurality of holes therein to receive the uncolored pegs drawn by the player from the first peg area of his board.

5. As the playing parts of a naval warfare game, for each player, a playing board having thereon a first area having thereon representations of a plurality of ships each having one or more peg holes the number of which is proportional to the relative offensive power of the type of ship represented, the peg holes of different representations being differently colored, a second area having a plurality of peg holes therein, and a number of pegs equal to the number of peg holes in the second area, some but not all of said pegs being colored at a part thereof which is not visible when the peg is in a peg hole of the second area, the colored pegs corresponding in number and color to the colored peg holes of the representations of ships in the first area.

6. As the playing parts of a naval warfare game, for each player, a playing board having thereon a first area having thereon representations of a plurality of ships each having one or more peg holes the number of which is proportional to the relative offensive power of the type of ship represented, the peg holes of different representations being differently colored, a second area having a plurality of peg holes therein, and a number of pegs equal to the number of peg holes in the second area, some but not all of said pegs being colored at a part thereof which is not visible when the peg is in a peg hole of the second area, the colored pegs corresponding in number and color to the colored peg holes of the representations of ships in the first area, and the remaining pegs being uncolored.

7. As the playing parts of a naval warfare game, for each player, a playing board having thereon a first area having thereon representations of a plurality of ships each having one or more peg holes the number of which is proportional to the relative offensive power of the type of ship represented, the peg holes of different representations being differently colored, a second area having a plurality of peg holes therein, and a number of pegs equal to the number of peg holes in the second area, some but not all of said pegs being colored at a part thereof which is not visible when the peg is in a peg hole of the second area, the colored pegs corresponding in number and color to the colored peg holes of the representations of ships in the first area, the remaining pegs being uncolored, and a third area having a plurality of peg holes therein.

References Cited

UNITED STATES PATENTS 2,058,079   10/1936   Heath _____ 273—130
3,212,782   10/1965   Jungels _____ 273—130

DELBERT B. LOWE, *Primary Examiner.*